Dec. 25, 1951  A. ABGARIAN  2,580,266
MOWER STRUCTURE
Filed April 29, 1946  4 Sheets-Sheet 3

INVENTOR.
ARAM ABGARIAN
BY
ATTORNEYS

Dec. 25, 1951     A. ABGARIAN     2,580,266
MOWER STRUCTURE

Filed April 29, 1946     4 Sheets-Sheet 4

INVENTOR.
ARAM ABGARIAN
BY
Whittemore, Hulbert & Belknap
ATTORNEYS

Patented Dec. 25, 1951

2,580,266

UNITED STATES PATENT OFFICE 2,580,266

MOWER STRUCTURE

Aram Abgarian, Detroit, Mich., assignor to Detroit Harvester Company, Detroit, Mich., a corporation of Michigan Application April 29, 1946, Serial No. 665,766

29 Claims. (Cl. 56—25)

This invention relates generally to mowing machines and refers more particularly to improvements in mowing equipment of the type attachable to a tractor at the rear end thereof.

Mowing machines of the above general type are usually equipped with a cutter bar assembly which extends laterally outwardly from one side of the tractor substantially parallel to the ground when in operation. The inner end of the cutter bar assembly is ordinarily hingedly connected to the draw bar of the tractor to enable swinging movement of the cutter bar assembly to an upright or inoperative position when the mowing machine is being transported by the tractor from one field of operation to another.

In the majority of orthodox mowing machines, the cutter bar asembly is raised by hand to its upright or inoperative position, and it is one of the objects of this invention to provide improved counterbalancing means for assisting swinging movement of the cutter bar assembly to its upright position.

It is also common practice to vary the elevation of the cutter bar assembly, and it is a further object of this invention to provide counterbalancing means which is instrumental in assisting elevating the cutter bar assembly.

The foregoing, as well as other objects, will be made more apparent as this description proceeds, especially when considered in connection with the accompanying drawings, wherein:

Figure 7 is an enlarged horizontal fragmentary sectional view taken through the axis of the eccentric pin 38.

Figure 1:
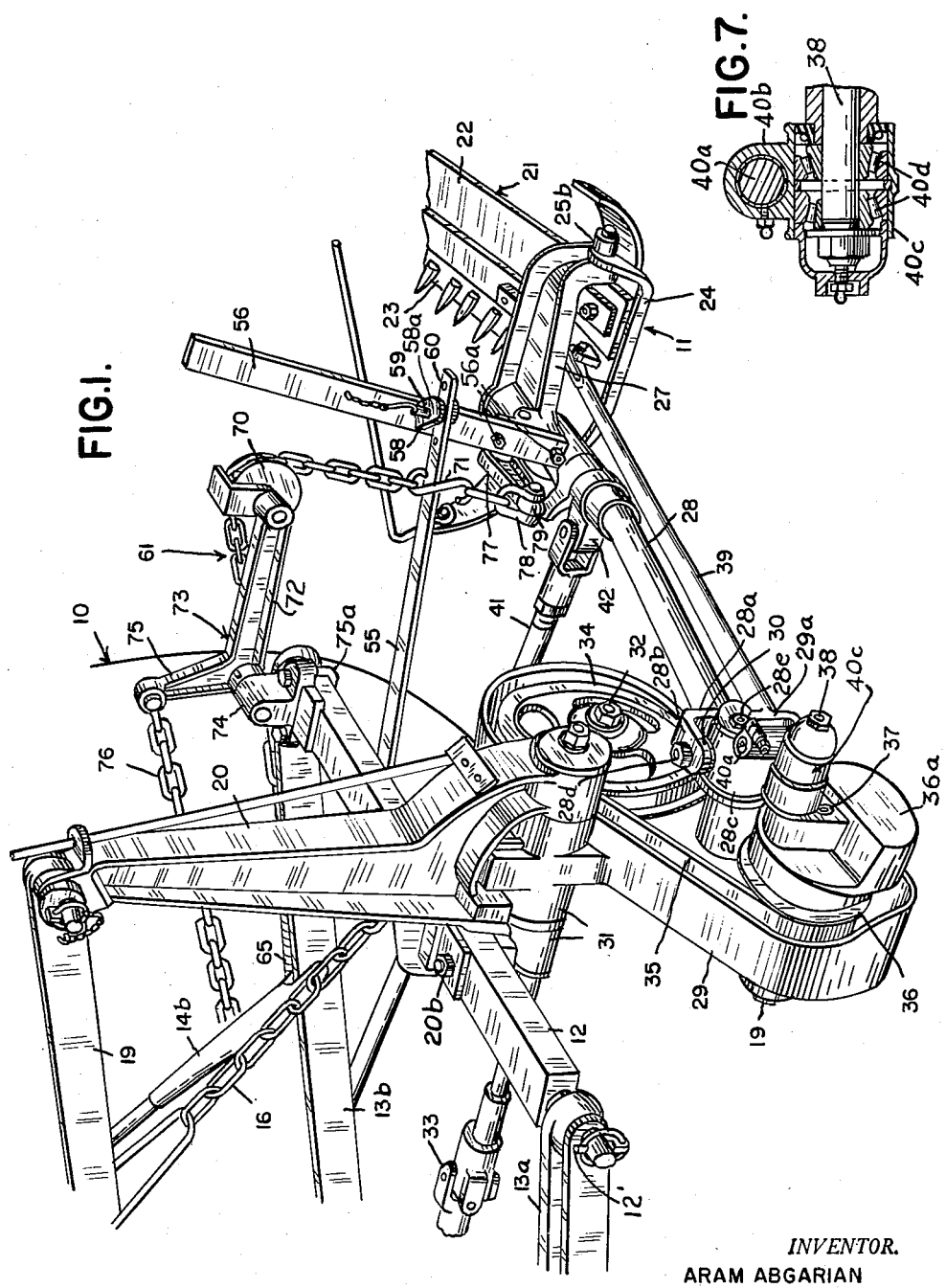
Figure 1 is a fragmentary perspective view of a mowing machine showing the latter attached to a conventional type of tractor.
Figure 2:
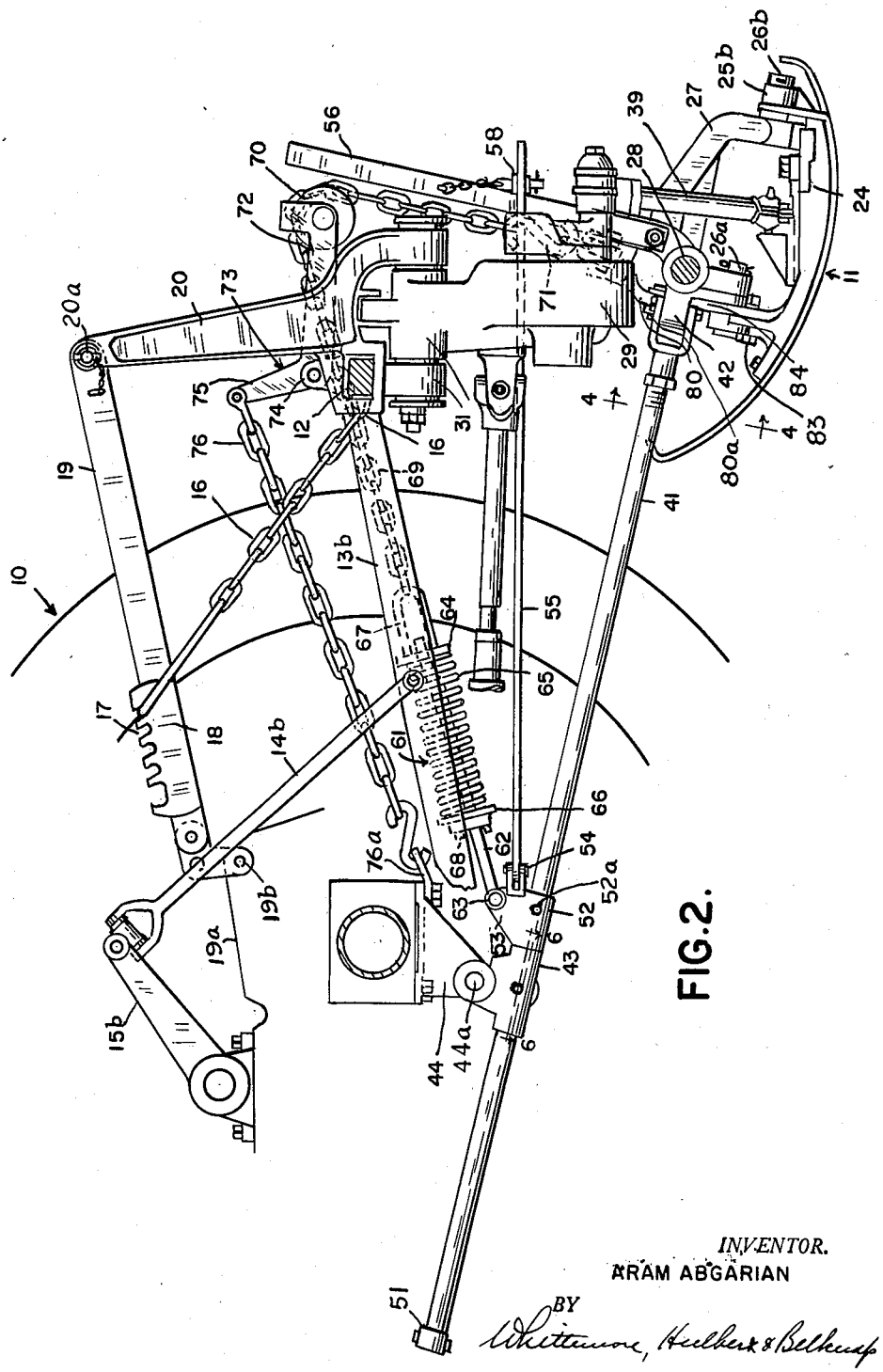
Figure 2 is a side elevational view of the mowing machine with parts broken away and in section, for clarity purposes.
Figure 3:
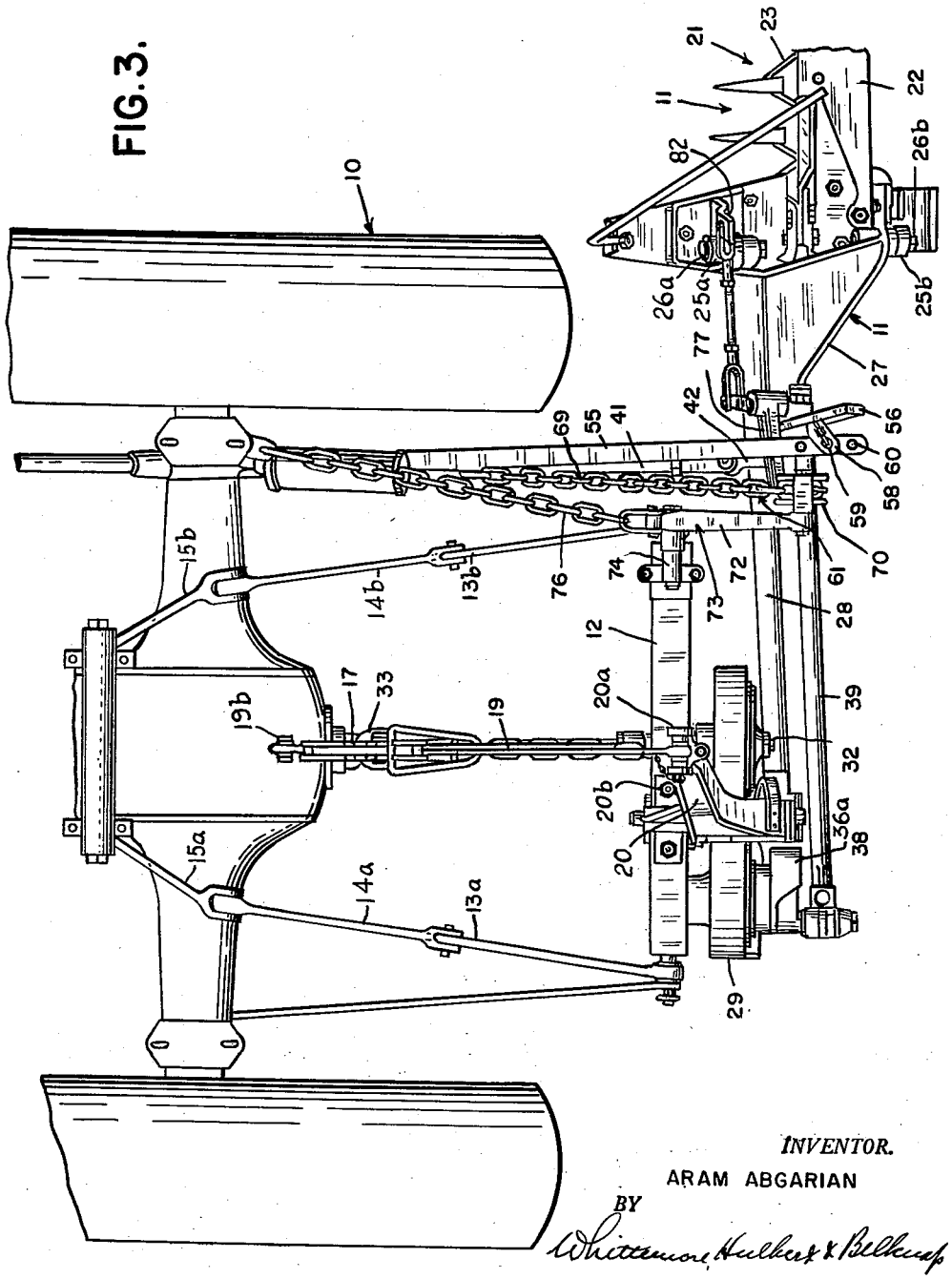
Figure 3 is a plan view of the construction shown in Figure 2.

Referring now more in detail to the drawing, it will be noted that the reference character 10 indicates a tractor, and the numeral 11 designates a mowing machine. The mowing machine is attachable to the tractor by a draw bar 12 extending transversely of the tractor at the rear end of the latter. The opposite ends of the draw bar 12 are respectively detachably connected by removable pins 12' to the rear ends of a pair of arms or draft links 13a and 13b which in turn have their forward ends pivotally supported in the usual manner on the tractor to permit vertical swinging movement of the rear end portions of the arms and associated draw bar 12. In accordance with orthodox practice, the arms are raised and lowered by power means which forms no part of this invention, and need not be described in detail. In general, a pair of links 14a and 14b have their lower ends respectively pivotally connected to the arms 13a and 13b intermediate the ends thereof and have their upper ends operatively connected to the power means (not shown) by levers 15a and 15b. Levers 15a and 15b are a standard part of the tractor, details of which form no part of the present inveintion. For example, levers of this type are shown in Figure 1 of Ferguson Patent 2,118,180. The arrangement is such that rocking movement of the levers 15a and 15b in a forward direction by the power means raises the rear ends of the arms 13a and 13b and lifts the draw bar 12. As will be presently described the cutter bar assembly of the mowing machine is suspended from the draw bar 12 and moves as a unit with the latter.

In addition, the draw bar may be adjusted to different elevations to vary the height of the cutter bar assembly relative to the ground and this is accomplished by providing a chain 16 having the rear end secured to the draw bar. The front end of the chain 16 is selectively engageable in notches 17 formed on a rack 18 having portions clamped to a link 19. The front end of the link 19 is pivoted to the body 19a of the tractor as indicated at 19b and the rear end of the link is pivoted to the upper end of a pedestal 20 as indicated at 20a, the pedestal having the lower end clamped to the draw bar 12 intermediate the ends of the latter as best seen at 20b in Fig. 1. The construction is such that movement of the upper end of the chain 16 longitudinally of the rack 18 varies the elevation of the draw bar 12 and the various parts of the mowing machine suspended from the draw bar.

The mowing machine 11 comprises a cutter bar assembly 21 adapted to extend laterally outwardly from one side of the tractor in parallel relationship to the ground and having a cutter bar 22 fashioned to support the usual knife 23 for reciprocation longitudinally of the cutter bar. The inner end of the cutter bar 22 is secured to a shoe 24 extending transversely of the cutter bar and having longitudinally spaced aligned bearings 25a and 25b. The common axis of the bearings 25a and 25b extends at right angles to the cutter bar, and the bearings respectively receive pins 26a and 26b formed on a hinge bracket 27. The above construction is such as to enable the cutter bar assembly 21 to be swung upwardly from the operative position thereof shown in Figure 1 of the drawings to an upright or inoperative position.

The hinge bracket 27 is supported on the outer end of a drag bar 28 for rocking movement about an axis perpendicular to the axis of swinging movement of the cutter bar assembly. The inner end of the drag bar 28 is mounted on a support or housing 29 by a universal connection 30 adapted to permit swinging movement of the drag bar in both a vertical plane and a substantially horizontal plane. Preferably the drag bar 28 is provided at its inner end with a yoke 28a having vertically spaced furcations 28b that straddle a collar 28c. The furcations 28b are pivotally connected to the collar 28c by vertical pins 28d. The collar 28c is mounted to turn on a stub shaft 28e carried by the housing 29. The housing 29 has a pivotal connection 31 with the pedestal 20 and also forms a support for the knife driving mechanism.

In general a drive shaft 32 is suitably journalled on the housing and is adapted to be connected to the power take off shaft 33 forming a part of the standard equipment of the tractor. A pulley 34 is secured to the drive shaft 32 and is connected by a belt 35 to a second pulley 36. The second pulley 36 is suitably secured to a driven shaft 37 journalled in the housing 29. Said pulley 36 is provided with a counterweight 36a and carries an eccentric pin 38 that in turn is operatively connected by a pitman rod 39 to the inner end of the reciprocable knife 23. In detail, a yoke 39a is secured to the inner end of the pitman rod 39 and has clamping engagement with a vertical pin 40a journalled in a bearing 40b formed on a collar 40c which in turn is mounted on a set of roller bearings 40d on the eccentric pin 38. Thus, with this construction, the pitman rod 39 can swing horizontally about the vertical axis of pin 40a.

Figure 6:
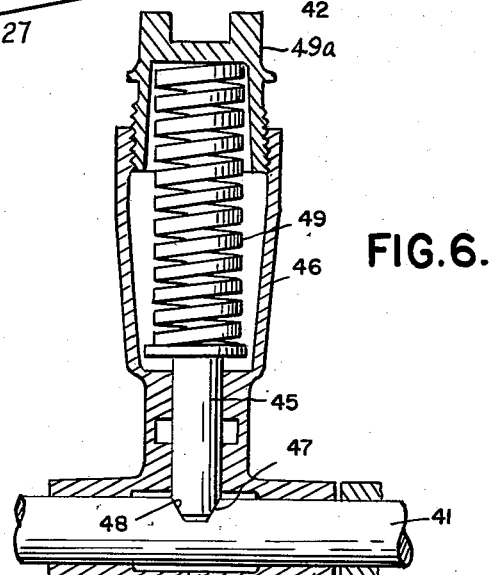
Figure 6 is an enlarged sectional view taken on the plane indicated by the line 6—6 of Figure 2.

The purpose of supporting the inner ends of the drag bar 28 and the pitman rod 39 for swinging movement in a horizontal plane is to enable the cutter bar assembly to swing back in the event the latter contacts a stump, rock or other obstruction. The swing back feature forms no part of the present invention and, therefore, need not be described in detail. In general, the cutter bar assembly is normally retained against rearward swinging movement by a pull bar 41 having its rear end pivotally coupled to the drag bar adjacent the inner side of the hinge bracket by a connection 42 and having its front end portion slidably supported in a sleeve 43. The sleeve 43 is pivoted at 44a to a bracket 44 which in turn is secured to a fixed part of the tractor. As shown in Figure 6 of the drawings, the pull bar 41 is normally latched to the sleeve 43 by a plunger 45 slidably supported in an extension 46 of the sleeve and having a cam portion 47 at the inner end engageable in a correspondingly shaped notch 48 formed in the pull bar. The position of the notch in the pull bar is such that when the plunger is in engagement therewith, the cutter bar assembly assumes its forwardmost or operative position shown in Figure 1 of the drawings. The plunger is normally retained into engagement with the pull bar by a compression spring 49 having one end engaging the outer end of the plunger and having the opposite end abutting an adjustable closure 49a for the extension 46. The strength of the spring is predetermined to maintain the pull bar in its latched position during normal operation of the mower, but on the other hand, permits the plunger to release the pull bar in the event the cutter bar assembly strikes an obstruction during operation. When this latter condition is encountered, the pull bar 41 is free to slide rearwardly, and the extent of rearward movement is limited by an enlargement 51 formed on the front end of the pull bar in a position to engage the corresponding end of the sleeve 43.

A second sleeve 52 is secured by a pin 52a to the pull bar 41 immediately in rear of the sleeve 43, and is formed with an upstanding web 53 having ears 54 projecting laterally therefrom. The ears 54 provide pivotal anchorage means for the front end of the tilt link 55 having the rear end attached to a tilt lever 56 intermediate the ends of the latter. The lower end of the tilt lever is rigidly secured by spaced fastening elements 56a to the hinge bracket 27 and a bifurcated projection 58 is formed on the lever to receive the rear end of the link 55. The furcations of the projection 58 are formed with aligned openings 58a therethrough for receiving a pin 59, and the rear end of the link is formed with a plurality of longitudinally spaced openings 60 for selectively engaging with the pin 59. Thus by manipulating the lever 56, cutter bar assembly may be tilted about the axis of the hinge mounting on the drag bar and may be secured in any one of the various tilted positions determined by the openings 60 in the link 55.

Figure 5:
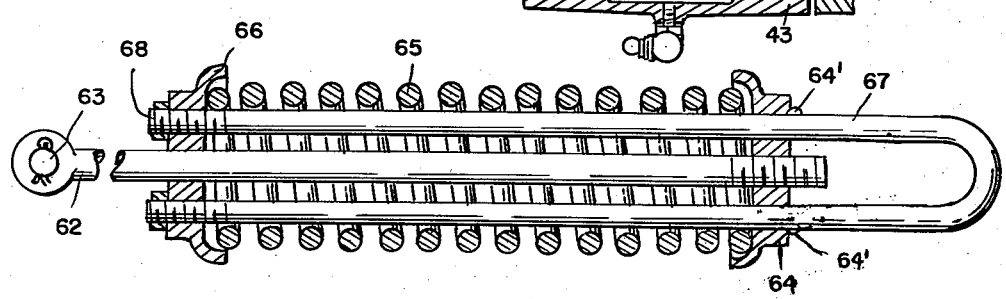
Figure 5 is an enlarged detail sectional view of the counterbalancing spring unit.

The upstanding web 53 on the sleeve 52 also forms a pivotal anchorage for the counterbalancing spring unit indicated generally by the reference character 61. The unit 61 comprises a rod 62 having the front end pivoted to the web 53 of the sleeve 52 by a pin 63 and having the rear end threadably engaging a head 64. A coil spring 65 surrounds the rod 62 at the front side of the head 64 and the rear end of the coil spring abuts the head 64. The front end of the coil spring 65 abuts a second head 66 secured to the extremities of a U-shaped bolt 67 by fastener elements 68. Preferably stops 64' for the head 64 are provided on the leg portions of the U-shaped bolt to maintain the spring 65 under compression. The base portion of the U-shaped bolt extends rearwardly beyond the head 64, and the leg portions of said bolt project through openings formed in the heads 64 and 66. The spring 65 encircles the leg portions of the U-shaped bolt between the heads 64 and 66. The head 66 is also apertured to freely receive the rod 62. Since head 64 is threaded on rod 62, the compression spring 65 tends to move the head 66, together with the U-shaped bolt 67, in a forward direction. In Figure 5, the parts are illustrated with bolt 67 in extreme forward position with stop 64' engaging head 64.

The base portion of the U-shaped bolt 67 is connected to the front end of a flexible linear member in the form of a chain 69 having the rear end portion reeved over a pulley 70 and provided with a hook 71 that is indirectly connected to the shoe 24, as hereinafter described.

The pulley 70 is rotatably supported on the rearwardly extending arm 72 of a bell crank lever 73 journalled on a bracket 74 for swinging movement in a vertical plane. The bracket 74 is suitably clamped to the draw bar 12 by a U-bolt 75a or equivalent device, and the other arm 75 of the bell crank lever 73 is connected to the rear end of a chain 76, the front end of the chain being connected to the bracket 44 at a point spaced rearwardly and upwardly from the pivotal mounting for the adjacent draw bar supporting arm 13b as indicated at 76a. The construction is such that the counterbalancing chain 69 elevates the cutter bar assembly through the bell crank lever 73 and chain 76 when the draw bar 12 is raised.

Figure 4:
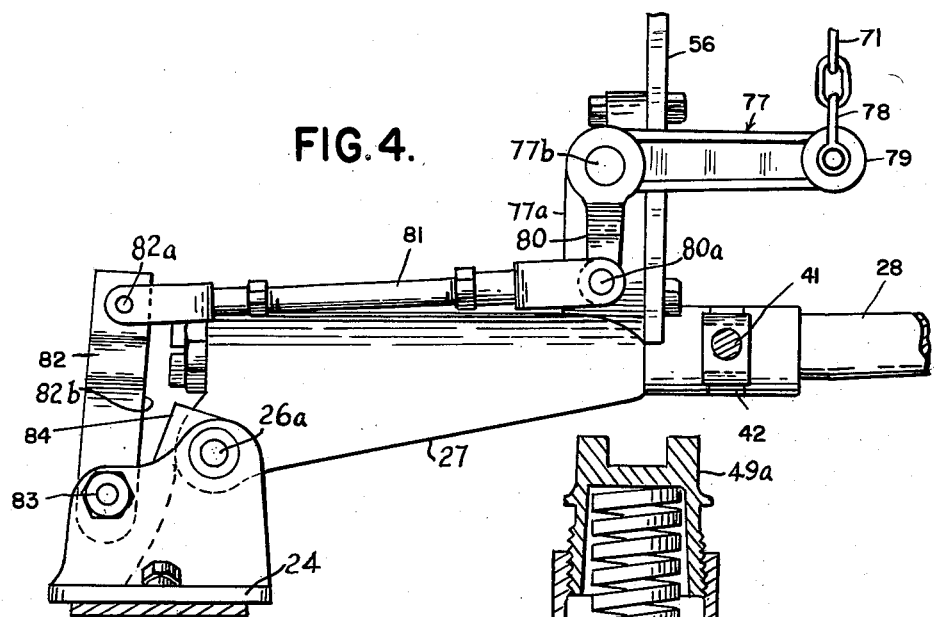
Figure 4 is an enlarged sectional view taken substantially on the plane indicated by the line 4—4 of Figure 2.

The connection between the hook 71 and the shoe 24 comprises a bell crank lever 77 supported on an upstanding lug 77a on the hinge bracket 27 for rocking movement about an axis indicated at 77b in Fig. 4, substantially parallel to the common axis of the hinge pins 26a and 26b and having a coupling 78 connecting the arm 79 of the bell crank lever to the hook 71. The other arm 80 of the bell crank lever is pivotally connected at 80a to the inner end of a link 81 which in turn has its outer end pivotally connected at 82a to the upper end of a lever 82. The lower end of the lever 82 is pivoted to the shoe by a pin 83 and the inner edge 82b of the lever normally abuts a shoulder 84 formed on the shoe above the axis of the hinge pins 26a and 26b.

It follows from the above that the spring 65 exerts a forward pull on the flexible linear member or chain 69, and this pulling force is transferred to the lever 82 by the bell crank lever 77. Thus, the counterbalancing spring 65 tends to move the upper end of the lever 82 inwardly, and since the inner edge of the lever abuts the shoulder 84 on the shoe, an outward thrust is applied to the shoe by the lower end of said lever below the axis of the pins 26a and 26b tending to rock the shoe, together with the cutter bar assembly, in an upward direction.

What I claim as my invention is:

1. The combination with a tractor having a draw bar supported for vertical movement, of a mowing machine comprising a cutter bar assembly adapted to assume a position substantially parallel to the ground, a connection between the draw bar and inner end of the cutter bar assembly permitting swinging movement of the latter to an upright position, a guide supported on the draw bar, a flexible linear member having the lower end connected to the inner end of the cutter bar assembly and extending upwardly over the guide to form a connection between the draw bar and cutter bar assembly for swinging upward the latter when the former is raised, and counterbalancing spring means acting on the linear member tending to raise the cutter bar assembly.

2. The combination with a tractor having a vertically movable draw bar, of a mowing machine comprising a cutter bar assembly adapted to assume a position substantially parallel to the ground, a connection between the draw bar and inner end of the cutter bar assembly permitting upward swinging movement of the latter to an upright position, a bell crank lever pivotally supported on the draw bar and having one arm connected to a fixed part, a guide supported on the other arm of the bell crank lever, and counterbalancing means for the cutter bar assembly including a flexible linear member having the lower end connected to the inner end of the cutter bar assembly and extending upwardly over the guide to form an operative connection between the draw bar and cutter bar assembly for swinging upward the latter when the former is raised.

3. The combination with a tractor having a vertically movable draw bar, of a mowing machine comprising a cutter bar assembly adapted to extend laterally outwardly from one side of the tractor and to assume a position substantially parallel to the ground, a connection between the draw bar and inner end of the cutter bar assembly permitting swinging movement of the latter to an upright position, a bell crank lever pivotally supported on the draw bar to be vertically adjusted therewith, a flexible linear member connecting one arm of the bell crank lever to a fixed part, a guide supported on the other arm of the bell crank lever, a second flexible linear member having the lower end connected to the inner end of the cutter bar assembly and extending upwardly over the guide being adapted to swing said assembly upward when said draw bar is raised, and spring operated counterbalancing means for the cutter bar assembly connected to the second named linear member.

4. The combination with a tractor having a draw bar and having arms pivotally supporting the draw bar on the tractor, of a mowing machine comprising a cutter bar assembly adapted to extend laterally outwardly from one side of the tractor and to assume a position substantially parallel to the ground, a connection between the draw bar and inner end of the cutter bar assembly permitting swinging movement of the latter to an upright position, a bell crank lever pivotally supported on the draw bar, a flexible linear member having one end connected to one arm of the bell crank lever and having the other end connected to a fixed part in offset relationship to the axis of swinging movement of the draw bar, a guide mounted on the other arm of the bell crank lever, and counterbalancing means for the cutter bar assembly including a second flexible linear member having the lower end connected to the inner end of the cutter bar assembly and extending over the guide to form a connection between the draw bar and cutter bar assembly for swinging the latter upward when the former is raised.

5. The combination with a tractor having a draw bar, of a mowing machine comprising a cutter bar assembly adapted to extend laterally outwardly from one side of the tractor and to assume a position substantially parallel to the ground, a connection between the draw bar and inner end of the cutter bar assembly permitting swinging movement of the latter to an upright position, a guide mounted on the draw bar, a flexible linear member having the lower end connected to the inner end of the cutter bar assembly and extending upwardly over the guide forming a connection therebetween for swinging said assembly upward when said draw bar is raised, means connecting the other end of the flexible linear member to a fixed part including a rod having the forward end pivoted to the fixed part and having a head secured to the rear end thereof, a second head slidably mounted on the rod and connected to the flexible linear member, and a counterbalancing spring supported between the heads and acting on the second head tending to move the flexible linear member in a direction to raise the cutter bar assembly.

6. The combination with a tractor having a vertically movable draw bar and a drag bar connected thereto, of a mowing machine comprising a cutter bar assembly having a shoe at the inner end thereof, a hinge bracket connected to the drag bar and having portions pivotally connected to the shoe permitting swinging movement of the cutter bar assembly to an upright position, a lever having the lower end pivoted to the shoe for swinging movement about an axis parallel to the axis of swinging movement of the cutter bar assembly and having the inner side abutting a shoulder on the shoe at a point spaced above the axis of swinging movement of the cutter bar assembly, a bell crank lever pivoted to the hinge bracket for rocking movement about an axis parallel to the pivotal movement of the lever and having one arm operatively connected to the upper end of the lever, a guide mounted on the draw bar, a flexible linear member having the lower end connected to the other arm of the bell crank lever and extending over the guide forming a connection for swinging said assembly upward when said draw bar is raised, and counterbalancing means connected to the flexible linear member tending to rotate the bell crank member in a direction to swing the cutter bar assembly upwardly.

7. The combination with a tractor having a draw bar and having provision for supporting the draw bar for vertical movement, of a mowing machine carried by the draw bar and having a cutter bar assembly, a pivotal mounting for the cutter bar assembly enabling vertical swinging movement of the cutter bar assembly between substantially horizontal and vertical positions, a connection between the draw bar and cutter bar assembly for swinging the cutter bar assembly in an upward direction in response to movement of the draw bar in a corresponding direction, and counter-balancing means in said connection normally urging the cutter bar assembly in an upward direction.

8. The combination with a tractor having a draw bar supported for vertical movement and having means for moving the draw bar in an upward direction, of a mowing machine carried by the draw bar and having a cutter bar assembly, means supporting one end of the cutter bar assembly enabling vertical swinging movement of the assembly between substantially horizontal and vertical positions, means connecting the draw bar to the cutter bar assembly for swinging the latter in an upward direction upon upward movement of the draw bar, and spring means associated with said connection for assisting upward swinging movement of the cutter bar assembly.

9. A mower attachment for a tractor provided with a pair of laterally spaced draft links pivotally attached thereto and a power lift therefor; said attachment comprising a frame detachably connected to the free end of said draft links to be carried thereby, a cutter bar assembly pivotally attached to said frame for angular movement relative thereto, a lifting element depending from said frame and connected to said cutter bar assembly, and mechanism carried by said frame including a forwardly extending link anchored to said tractor at a point offset from the pivotal connection of said draft links, said mechanism being adapted upon upward movement of said frame to draw upward to a greater extent said lifting element thereby swinging upward said cutter bar assembly relative to said frame.

10. A mower attachment for a tractor provided with a pair of laterally spaced draft links pivotally attached thereto, and a power lift therefore; said attachment including a frame carried by the free end of said draft links, an arm pivotally attached to said frame and extending laterally, a cutter bar assembly pivotally attached to the outer end of said arm for angular movement relative thereto, a pull member depending from said frame for swinging upward relative thereto said arm and cutter bar assembly, mechanism on said arm to which said pull member is directly attached adapted by the pull thereof to first swing upward said cutter bar assembly relative to said arm and then swing upward said arm with said assembly about the pivotal attachment to said frame, and mechanism mounted on said frame including a link connected to an anchor point on said tractor which is offset from the pivotal connection of said draft links, said last mentioned mechanism being adapted upon the raising of said frame by said power lift to simultaneously draw upward on said depending pull member to raise said arm and cutter bar assembly to a greater extent.

11. The construction as in claim 10 having a movable bearing member actuated by the mechanism on said frame, and said pull member being flexible, passing over said bearing and forward therefrom and being anchored at its forward end.

12. The construction as in claim 11 having the anchor for said flexible pull member formed by a rigid rod extending forward from said cutter bar assembly.

13. A mower attachment for a tractor provided with a pair of laterally spaced draft links pivotally attached thereto, and a power lift therefor; said attachment comprising a frame connected to the free end of said draft links to be carried thereby, a cutter bar assembly pivotally attached to said frame for angular movement relative thereto, a rigid rod connected to and extending forward from said cutter bar assembly, mechanism mounted on said frame including a movable bearing member and a link for actuating the same extending forward to an anchorage on said tractor offset from the pivotal connection of said draft links, a flexible pull member having its forward end connected to said rigid rod and extending rearward over said bearing member to depend therefrom with its lower end connected to said cutter bar assembly, and break back means normally holding said cutter bar assembly in laterally extending operative position but adapted upon overload to permit the rearward swinging thereof, whereby the power raising of said frame will through said link simultaneously actuate said movable bearing member to draw up the depending portion of said flexible pull member and raise said cutter bar assembly in relation to said frame, and whereby upon release of said break back said flexible pull member will travel freely over said bearing member without interference with the rearward swinging of said cutter bar assembly.

14. The construction as in claim 13 having the break back means formed by a member anchored to the tractor with which said rigid rod has a traveling engagement together with a latch member for normally resisting such movement but releasable upon overload.

15. In a mower attachment for a tractor having a pair of laterally spaced draft links trailingly pivoted on its rear end portion and connected to a power lift device on the tractor for vertical shifting movement of said links, a frame arranged to span the links, means for detachably connecting said frame to the links for bodily lifting and lowering of such frame, a supporting arm, means pivoting said arm at one end to said frame to swing upward from a normal downwardly inclined and laterally projecting position, a mower bar pivoted on the outer end of said arm to swing vertically with reference thereto, a lever pivoted on said frame to rock fore and aft thereon, means including a force transmitting link connected to said lever and extending forwardly therefrom for attachment to a tractor borne pivot point eccentric to the pivotal axis of the draft links for rocking said lever as an incident to vertical movement of said frame by the draft links, means including a flexible line connected at one end to said mower bar and adapted to be anchored at the other end adjacent the rear end of the tractor for raising said bar and arm upon tensioning of said line, and means on said lever engageable with an intermediate portion of said line to tension the same in response to rocking of said lever as an incident to bodily lift of said frame by the draft links.

16. In an implement for a tractor having a draft link trailingly pivoted to its rear end portion for vertical movement by power lift device on the tractor connected to such link, the combination of an implement frame adapted to be connected to said link for bodily lifting and lowering thereby, a bell crank lever pivoted on said frame to rock fore and aft thereon, means for rocking said lever as an incident to bodily raising and lowering of said frame by the draft link and including a force transmitting link connected at one end to the first arm of said bell crank lever and having means on its other end for connection of the same to the tractor at a point eccentric to the pivotal axis of the draft link, an element movably connected to said frame, a flexible line anchored at one end adjacent the rear end of the tractor and at the other end to said element, and means including a guide carried by the second arm of said bell crank lever and having said line trained thereover for tensioning and slacking off said line to move said element in accordance with the rocking of said lever incident to the raising and lowering of said frame by the draft link.

17. In a mower attachment for a tractor having a draft link trailingly pivoted at its rear end portion for vertical movement by a power lift device on the tractor connected to such link, the combination of a frame structure adapted to be connected to said link for bodily lifting and lowering thereby, a lever pivoted on said frame to rock fore and aft thereon, means for rocking said lever as an incident to bodily raising and lowering of said frame by the draft link and including a force transmitting link connected at one end to said lever and having means at the other end for connection of the same to the tractor at a point eccentric to the pivotal axis of the draft link, a mower bar projecting laterally from said frame structure and pivoted thereto for vertical swinging movement, a loop of flexible line, said loop having one end anchored adjacent the rear end of the tractor and having its other end connected to an operating arm projecting generally upward from said mower bar, and means including a guide carreid by said lever and having said line trained thereover for tensioning and slacking off said loop of line to respectively raise and lower said mower bar in accordance with the rocking of said lever incident to raising and lowering of said frame by the draft link.

18. In a mower attachment for a tractor having a pair of laterally spaced draft links trailingly pivoted on its rear axle housing for vertical movement by a power lift device on the tractor connected to such links, the combination of a frame adapted to be connected to the draft links in spanning relation to their rear end portions for bodily lifting and lowering by the links, a supporting arm pivoted on said frame to swing vertically with reference thereto and having a mower bar projecting laterally from its outer end, said mower bar being pivoted to said supporting arm to swing vertically with reference to the latter, a lever pivoted on the end portion of said frame adjacent said mower bar to rock fore and aft on said frame, means for rocking said lever as an incident to bodily raising and lowering of said frame by the draft links and including a force transmitting link connected at one end to said lever and having means at the other end for connecting the same to the rear axle housing of the tractor at a point eccentric to the pivotal axis of the draft links and substantially directly forward of said end portion of said frame, a flexible line having means for anchoring the same at one end adjacent the rear end of the tractor, means for connecting its other end of said line to the mower bar, and means including a guide carried by said lever and having said line trained thereover for tensioning and slacking off said line to raise and lower said mower bar and supporting arm therefor in accordance with the rocking of said lever incident to raising and lowering of said frame by the draft links.

19. In a mower attachment for a tractor having a draft link trailingly pivoted on its rear end portion and connected to a power lift device on the tractor for vertical swing of such link by said device, the combination of a frame, means for connecting said frame to the draft link for haulage thereby as well as for bodily lifting movement by the same, a mower bar, means including an arm for pivotally connecting said bar to said frame for both vertical and rearward movement with reference thereto, overload means for releasably retaining said bar against rearward swing with reference to said frame, a lever rockably mounted on said frame and having a guide at the end thereof, means for rocking said lever in response to bodily lifting and lowering of said frame by the draft link, a flexible operating line trained over said guide and operatively connected to said bar for raising the same upon upward rocking movement thereof, and an anchoring member for said line for normally anchoring the same relative to the tractor, said anchoring member being connected to said arm for movement therewith so that the arm is free to move rearwardly free of restraint from said line.

20. In a mower attachment for a tractor, the combination of a support having a mower bar projecting laterally therefrom and pivoted thereto to swing vertically, frame means for detachably connecting said support in trailed relation to the tractor while leaving said support and bar free to swing rearwardly as a unit about a vertical axis displaced inboard of the inner end of said mower bar, a pair of drag links adapted to be connected respectively to the tractor and to said unit, a releasable connection between said drag links adapted to release them for longitudinal sliding movement relative to each other upon application thereto of a predetermined tension and normally holding them together in position such that said bar projects laterally in working position, a lifting member movably mounted on said frame means, means including a flexible line trained over said lifting member and connected to said mower bar as well as to an anchorage member for raising and lowering of said bar in response to movement of said lifting member, and means for fixing said anchorage member to the one of said drag links connected to said unit.

21. In a mower attachment for a tractor, the combination of a support having a mower bar projecting laterally therefrom and pivoted thereto to swing vertically as well as for twisting of said bar about its longitudinal axis to vary its pitch, frame means for detachably connecting said support in trailed relation to the tractor while leaving said support free to swing rearwardly, a pair of drag links adapted to be connected respectively to the tractor and to said support, a releasable connection between said drag links adapted to release them for longitudinal sliding movement relative to each other upon the application of a predetermined tension thereto and normally holding them together in such position that said bar projects laterally in working position, a lifting member movably mounted on said frame means, means including a flexible line trained over said lifting member and connected to said mower bar for raising and lowering said bar in response to movement of said lifting member, a pitch adjusting lever connected to said bar, a holding member adapted to be releasably connected to said pitch adjusting lever for retaining the latter in predetermined position, and means for connecting both said holding member and said line to the one of said drag links connected to said support for movement therewith upon release of said releasable connection.

22. In a mower attachment for a tractor having a pair of laterally spaced draft links trailingly pivoted on its rear end portion and connected to a power lift device on the tractor for vertical swinging movement by the same, the combination of a first frame having spaced connectors for detachable connection to the ends of the respective draft links for haulage as well as for bodily lifting and lowering by the same, a second frame including an integral laterally-extending supporting arm pivoted on said first frame at an elevated point in the vicinity of the connectors and swingable about a rearwardly extending axis between a normal lowered position in which the outer end of the arm is closely adjacent the ground and an elevated position in which the arm extends generally horizontally, a mower bar carried by said arm and projecting laterally from the lower end of the latter, and mechanism having one portion adapted for anchoring adjacent the tractor and another portion arranged for movement with the draft links for effecting an upward swing of said second frame and its attached mower bar with reference to said first frame and about the pivot connection between the frames in response to bodily lifting of the first frame by the draft links.

23. In a mower attachment for a tractor having a pair of laterally spaced draft links trailingly pivoted on its rear end portion and connected to a power lift device on the tractor for vertical swinging movement by the same, the combination of a first frame having spaced connectors for detachable connection to the ends of the respective draft links for haulage as well as for bodily lifting and lowering by the same, a second frame including an integral laterally-extending supporting arm pivoted on said first frame at a point lying generally between the connectors and swingable about a rearwardly extending axis between a normal lowered position in which the outer end of the arm is closely adjacent the ground and an elevated position in which the arm extends generally horizontal, a mower bar projecting laterally from the outer end of said arm and pivoted thereto for vertical swinging movement, and mechanism having portions adapted for connection to the tractor and links respectively for effecting a sequential upward swing of said mower bar with reference to said second frame and thereafter an upward swing of said second frame with reference to said first frame about their pivot connections all in response to bodily lifting of said first frame by the draft links.

24. In a mower attachment for a tractor having a pair of laterally spaced draft links trailingly pivoted on its rear end portion and connected to a power lift device on the tractor for vertical swinging movement by the same, the combination of a first frame having spaced connectors for detachable connection to the ends of the respective draft links for haulage as well as for bodily lifting and lowering by the same, a second frame including an integral laterally extending supporting arm pivoted on said first frame at a point between the connectors and swingable about a rearwardly extending axis between a normal lowered position in which the outer end of the arm is closely adjacent the ground and an elevated position in which the arm extends generally horizontally, a mower bar carried by said arm and projecting laterally from the lower end of the latter, and means including an operator actuated by movement of the links with respect to the tractor for automatically effecting an upward swing of said second frame and its attached mower bar with reference to said first frame and about the pivot connection between the frames in response to bodily lifting of the first frame by the draft links.

25. In an implement for a tractor having a pair of laterally spaced draft links trailingly pivoted to its rear end portion for vertical movement by a power lift device on the tractor, the combination of an implement frame having spaced connectors for detachable connection to the ends of the respective draft links, a lever pivoted on said frame to rock fore and aft thereon, means for rocking said lever as an incident to bodily raising and lowering of said frame by the draft links, said rocking means including a force transmitting link connected at one end to said lever and having means at its other end for connection of the link to the tractor at a point eccentric to the pivotal axis of the draft links, an emplement supporting arm pivoted to said frame at a point lying between the rear ends of the draft links and having an implement connected thereto, a flexible line adapted to be anchored at one end adjacent the rear end of the tractor and operatively connected at the outer end to said supporting arm, and means including a guide carried by said lever and having said line trained thereover for tensioning and slacking off said line to swing the supporting arm upwardly from a normal lowered position to a raised position incident to the raising of the implement frame by the draft links.

26. In a mower attachment for a tractor having a pair of laterally spaced draft links trailingly pivoted on its rear end portion and connected to a power lift device on the tractor for vertical swinging movement by the same, the combination of a first frame having spaced connectors for detachable connection to the ends of the respective draft links for haulage as well as for bodily lifting and lowering by the same, a second frame including an integral laterally extending supporting arm pivoted on said first frame at a point lying generally between the connectors and swingable about a rearwardly extending axis between a normal lowered position in which the outer end of the arm is closely adjacent the ground and an elevated position in which the arm extends generally horizontal, a mower bar projecting laterally from the outer end of said arm and pivoted thereto for vertical swinging movement, and means including an operator actuated by movement of the links for automatically effecting a sequential upward swing of said mower bar with reference to said second frame and thereafter an upward swing of said second frame with reference to said first frame about their pivot connection in response to bodily lifting of said first frame by the draft links, said operator means including a lost motion connection for permitting rise and fall of the mower bar in passing over uneven ground.

27. A mower attachment for a tractor having a pair of laterally spaced draft links trailingly pivoted on its rear end axle housing for vertical swinging movement by a power lift device on the tractor, the combination of a frame having spaced connectors for detachable connection to the ends of the draft links for haulage as well as for bodily lifting and lowering of the same, a laterally-extending supporting arm having a pivot connection with said frame in the region of the trailing ends of the links and having a mower bar at its outer end, said pivot connection permitting movement of the arm about a vertical axis as well as about an axis extending fore and aft, means including a loop of flexible line having one end operatively connected to the supporting arm in a direction to draw the same upwardly, means for normally anchoring said line with respect to the tractor, means for engaging the loop of line and tending to elongate the same upon upward swinging movement of the draft links so that the supporting arm is swung upwardly in unison therewith, overload means for releasably retaining said arm against rearward swing with respect to the first frame, the anchoring means at the forward end of the line being mounted for movement with said arm upon rearward overload release of the same so that the arm is free to move rearwardly free of restraint from said line.

28. In a mower attachment for a tractor having a pair of laterally spaced draft links trailingly pivoted on its rear end portion and connected to a power lift device on the tractor for vertical shifting movement of said links, a frame arranged to span the links, means for detachably connecting said frame to the links for bodily lifting and lowering of such frame, a supporting arm, means pivoting said arm at one end to said frame to swing upward from a normal downwardly inclined and laterally projecting position, a mower bar pivoted on the outer end of said arm to swing vertically with reference thereto, a bell crank lever pivoted on said frame to rock fore and aft thereon about a horizontal axis, means including a force transmitting link connected to a first arm of said bell crank lever and extending forwardly therefrom for attachment to a tractor borne pivot eccentric to the pivotal axis of the draft links for rocking said lever as an incident to vertical movement of said frame by the draft links, means including a flexible line connected at one end to said mower bar and adapted to be anchored at the other end adjacent the rear end of the tractor for raising said bar upon tensioning of said line, and a sheave on the second arm of said bell crank lever over which said line is trained.

29. In a mower attachment for a tractor having a draft link trailingly pivoted on its rear end portion for vertical movement by a power lift device on the tractor connected to such link, the combination of a frame adapted to be connected to the draft link for bodily lifting and lowering thereby, a supporting arm pivoted on said frame to swing vertically with reference thereto, and having a mower bar projecting laterally from its outer end, said mower bar being pivoted to said arm to swing vertically with reference thereto, and having a mower bar projecting laterally from its outer end, said mower bar being pivoted to said arm to swing vertically with reference to the latter, a generally upright operating lever rockably mounted on said mower bar at a point substantially coincident with the axis of pivotal connection of the latter to said supporting arm, a guide sheave carried by said frame, a loop of flexible line connected at one end to said lever and at its other end to the tractor with the central portion thereof trained over said sheave, means operable in response to elevation of the frame by the draft link for urging said sheave outwardly with respect to said loop and tensioning said line, and an abutment fixed to said bar and disposed for contact with said lever upon rocking of the latter by tensioning of said line.

ARAM ABGARIAN.

REFERENCES CITED

The following references are of record in the file of this patent:

UNITED STATES PATENTS

| Number | Name | Date |
|---|---|---|
| 1,908,555 | Rawls | May 9, 1933 |
| 1,915,548 | Paul | June 27, 1933 |
| 2,310,387 | Blair et al. | Feb. 9, 1943 |
| 2,335,510 | Hansen | Nov. 30, 1943 |
| 2,354,710 | Simpson et al. | Aug. 1, 1944 |
| 2,502,805 | Spurlin | Apr. 29, 1946 |